United States Patent
Baros et al.

(10) Patent No.: US 11,536,588 B2
(45) Date of Patent: Dec. 27, 2022

(54) INDUCTIVE POSITION SENSOR WITH INTEGRATED FAULT DETECTION

(71) Applicant: SEMICONDUCTOR COMPONENTS INDUSTRIES, LLC, Phoenix, AZ (US)

(72) Inventors: Pavel Baros, Zastavka u Brna (CZ); Michal Olsak, Sokolnice (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 178 days.

(21) Appl. No.: 17/035,983

(22) Filed: Sep. 29, 2020

(65) Prior Publication Data
US 2022/0026244 A1     Jan. 27, 2022

Related U.S. Application Data

(60) Provisional application No. 63/057,108, filed on Jul. 27, 2020.

(51) Int. Cl.
     *G01D 5/20*       (2006.01)

(52) U.S. Cl.
     CPC ......... *G01D 5/2006* (2013.01); *G01D 5/2073* (2013.01)

(58) Field of Classification Search
     CPC ............................ G01D 5/2006; G01D 5/2073
     See application file for complete search history.

(56) References Cited

U.S. PATENT DOCUMENTS

| | | | |
|---|---|---|---|
| 5,517,431 A * | 5/1996 | Pattantyus | G01P 21/02 73/514.39 |
| 6,366,078 B1 | 4/2002 | Irle et al. | |
| 9,625,279 B2 | 4/2017 | Olsak et al. | |
| 2004/0193988 A1 | 9/2004 | Saloio | |
| 2015/0362341 A1 * | 12/2015 | Kirschner | G01D 5/2073 324/207.18 |
| 2016/0273945 A1 | 9/2016 | Olsak et al. | |

* cited by examiner

*Primary Examiner* — Walter L Lindsay, Jr.
*Assistant Examiner* — Milton Gonzalez
(74) *Attorney, Agent, or Firm* — Ramey LLP

(57) ABSTRACT

An integrated circuit is provided for use in a sensor system having a plurality of sensing coils arranged in a star configuration coupled to terminals of an integrated circuit, such that a first and a second terminal are connected external to the integrated circuit via a loop including a first and a second sensing coil in the plurality of sensing coils. The integrated circuit includes: sensing circuitry for evaluation of sense signals received from the sensing coils via said terminals; a current source and a current sink coupled to respectively a first and a second of said terminals, such that upon supply of current from the current source a current is established through the loop external to the integrated circuit and a detection signal is generated; and an evaluator for evaluating one of more detection signals to detect failure and/or weakness within said loop.

20 Claims, 4 Drawing Sheets

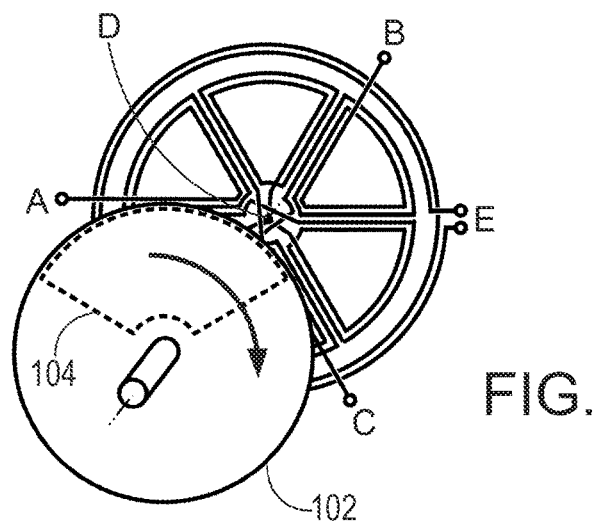
FIG. 1A
FIG. 1B
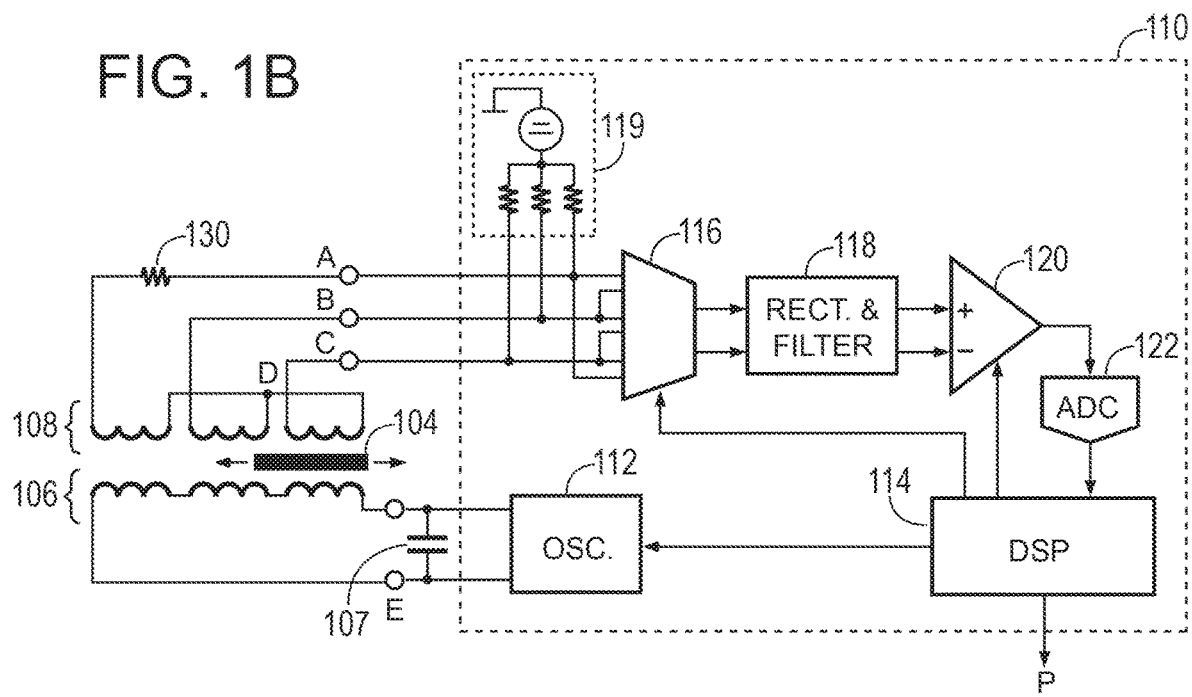
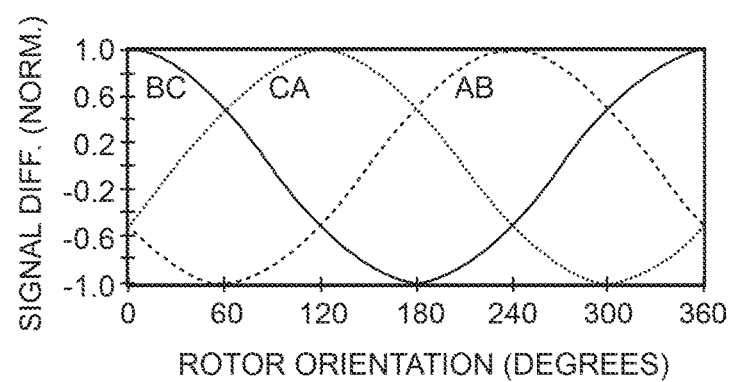
FIG. 1C

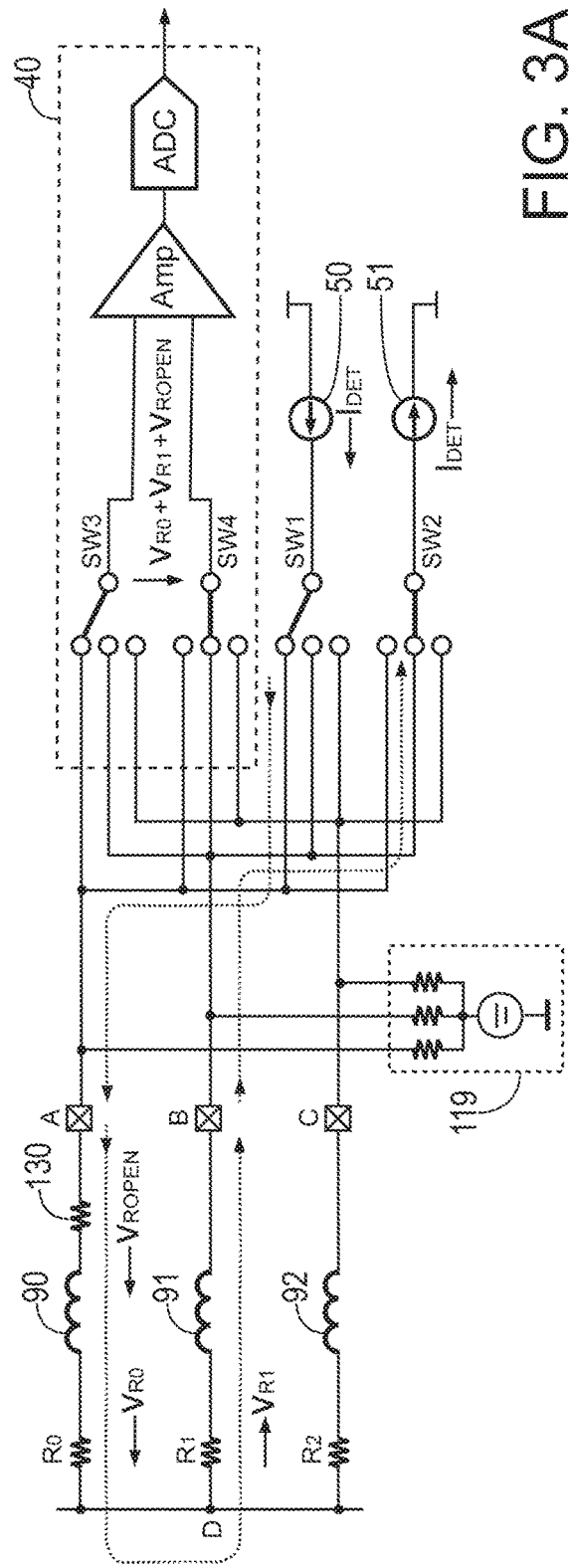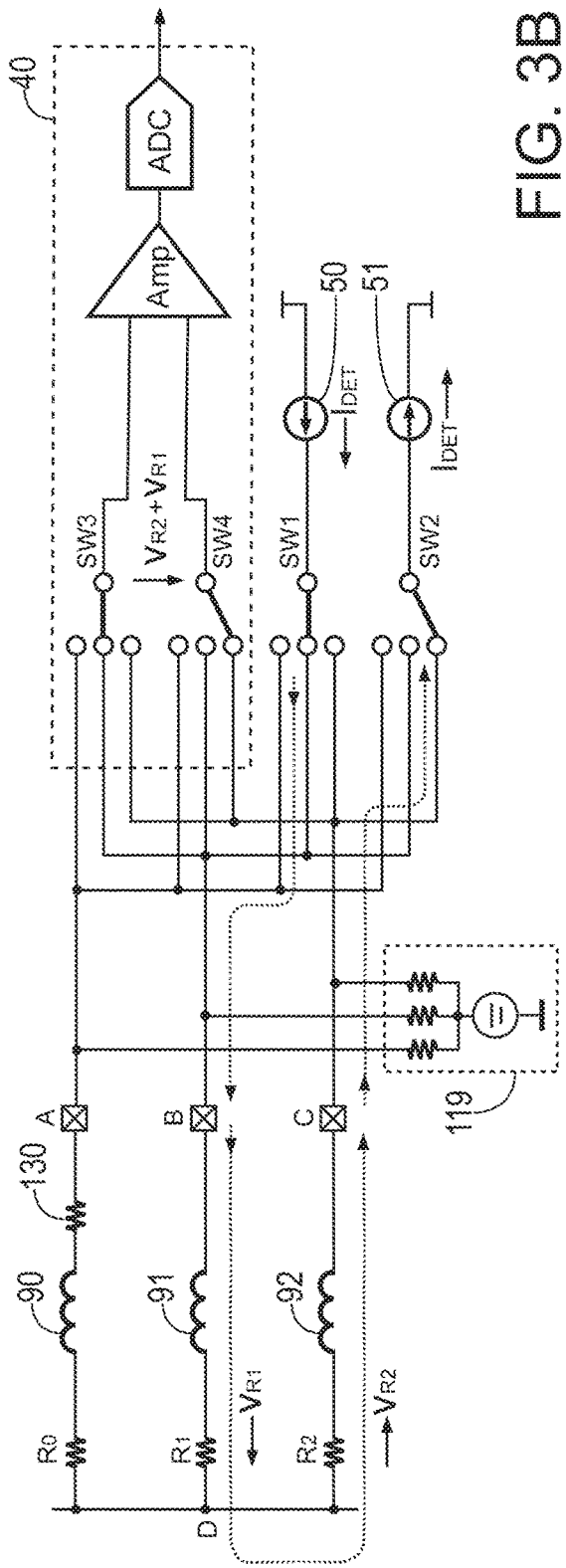
FIG. 3A
FIG. 3B

INDUCTIVE POSITION SENSOR WITH INTEGRATED FAULT DETECTION

CROSS-REFERENCE TO RELATED APPLICATIONS

The present application claims priority to U.S. Provisional Application 63/057,108, filed 2020 Jul. 27 and titled "Sensor system, integrated circuit and detection method" with inventors Pavel Baros and Michal Olsak, which is hereby incorporated herein by reference.

BACKGROUND

Inductive sensors are used in a wide variety of applications including automotive, computing, medical, telecommunications, and industrial applications. Specifically, inductive sensors may be used to measure position, distance, and speed, especially of conductive objects. Metal detectors, traffic signals, and a host of industrial processes use inductive sensors. One advantage of inductive sensors is that the associated signal processing circuitry need not be electrically connected to the measured object. This advantage enables inductive sensors to be used for sensing in harsh environments where other sensing techniques would otherwise require relatively delicate silicon-based electronics located at the sensing point. Consequently, inductive sensors are often used for safety related, safety critical, or high reliability applications.

Inductive sensors may include sensing coils coupled in a star configuration. Specifically, a star configuration includes multiple coils coupled at a shared node, which is called a star point. The coils can be created directly on a printed circuit board (PCB) together with other electronics. One example of a sensor system including sensing coils in a star configuration is disclosed in U.S. Pat. No. 6,366,078.

Advanced safety requirements, such as those found in the ISO 26262 standard, require verification of sensor operability and/or that weaknesses are detected prior to becoming failures. While access to the star point would be useful for enabling fault detection, it may be inaccessible due to routing restrictions on the PCB, safety requirements, and/or available number of integrated circuit I/O pins. Co-owned U.S. Pat. No. 9,625,279 discloses a system and method for open circuit detection without accessing the star point. A separate voltage source with defined resistance is present for each input pin, and one or more comparators to compare the resulting pin voltage to reference voltage. While this failure detection technique functions well to detect open circuit failures, it is less suitable for detecting signs indicative of imminent failure.

SUMMARY

Accordingly, there is disclosed herein an illustrative integrated circuit for use in a sensor system having a plurality of sensing coils arranged in a star configuration on a first side of each sensing coil, each of the sensing coils having a second side coupled to terminals of an integrated circuit, such that a first and a second terminal are connected external to the integrated circuit via a loop including a first and a second sensing coil in the plurality of sensing coils. The integrated circuit includes: sensing circuitry for evaluation of sense signals received from the sensing coils via said terminals; a current source and a current sink coupled to respectively a first and a second of said terminals, such that upon supply of current from the current source a current is established through the loop external to the integrated circuit and a detection signal is generated; and an evaluator for evaluating one or more detection signals to detect failure and/or weakness within said loop.

There is further disclosed an illustrative sensor system including the above integrated circuit. There is still further disclosed an illustrative method for detection of an open or weakened connection in such an inductive sensor system, the method including: applying a current through each of a first loop including the first and second sensing coils, a second loop including the second and third sensing coils, and a third loop including the first and third sensing coils, to obtain first, second, and third detection signals; and verifying that the first, second, and third detection signals match each other or a predetermined value to evaluate a status of connections in said plurality of sensing coils.

Each of the foregoing embodiments can be employed individually or in conjunction and may include one or more of the following features in any suitable combination: 1. the current source and the current sink are each coupled with at least one switch to said first and second terminal respectively. 2. the sensing circuitry comprises an amplifier, an analog-to-digital converter, and a digital signal processor, and the evaluator of detection signals is implemented in the digital signal processor. 3. the sensing circuitry includes a rectifier upstream of the analog-to-digital converter. 4. the sensing circuitry is configured for disabling and/or bypassing said rectifier during receipt of a detection signal. 5. the evaluator is coupled to the terminals via a test path comprising a multiplexer, an amplifier, and an analog-to-digital converter, said test path being arranged in parallel to the sensing circuitry. 6. each of said terminals is connected to a bias circuit. 7. an excitation coil, with the sensing coils being shifted relative to each other by a predefined angle, and a movable inductive coupling element arranged so as to define a magnitude of inductance between the excitation coil and the sensing coils on the basis of the movable inductive coupling element's position relative to the sensing coils. 8. the excitation coil is driven by a driving signal originating from an oscillator within the integrated circuit. 9. the evaluator is configured for detecting an open connection in the loop and a weakened connection in the loop relative to a proper connection in the loop. 10. a digital signal processor that is part of the sensing circuitry is configured for the provision of a control signal to enable the current source and optionally to set any switches between the current source and a selected terminal. 11. the one or more detection signals are amplified and converted from analog to digital prior to their evaluation.

BRIEF DESCRIPTION OF THE DRAWINGS

FIG. 1A is an isometric view of illustrative coils for sensing angular position of a rotor.

FIG. 1B is a schematic diagram of an illustrative angular position sensor with an equivalent circuit for the coil and rotor arrangement.

FIG. 1C is a graph of illustrative coil responses as a function of angular position.

FIGS. 3A and 3B are schematic diagrams of illustrative current loops in selected parts of the sensor.

NOMENCLATURE

Figure 2:
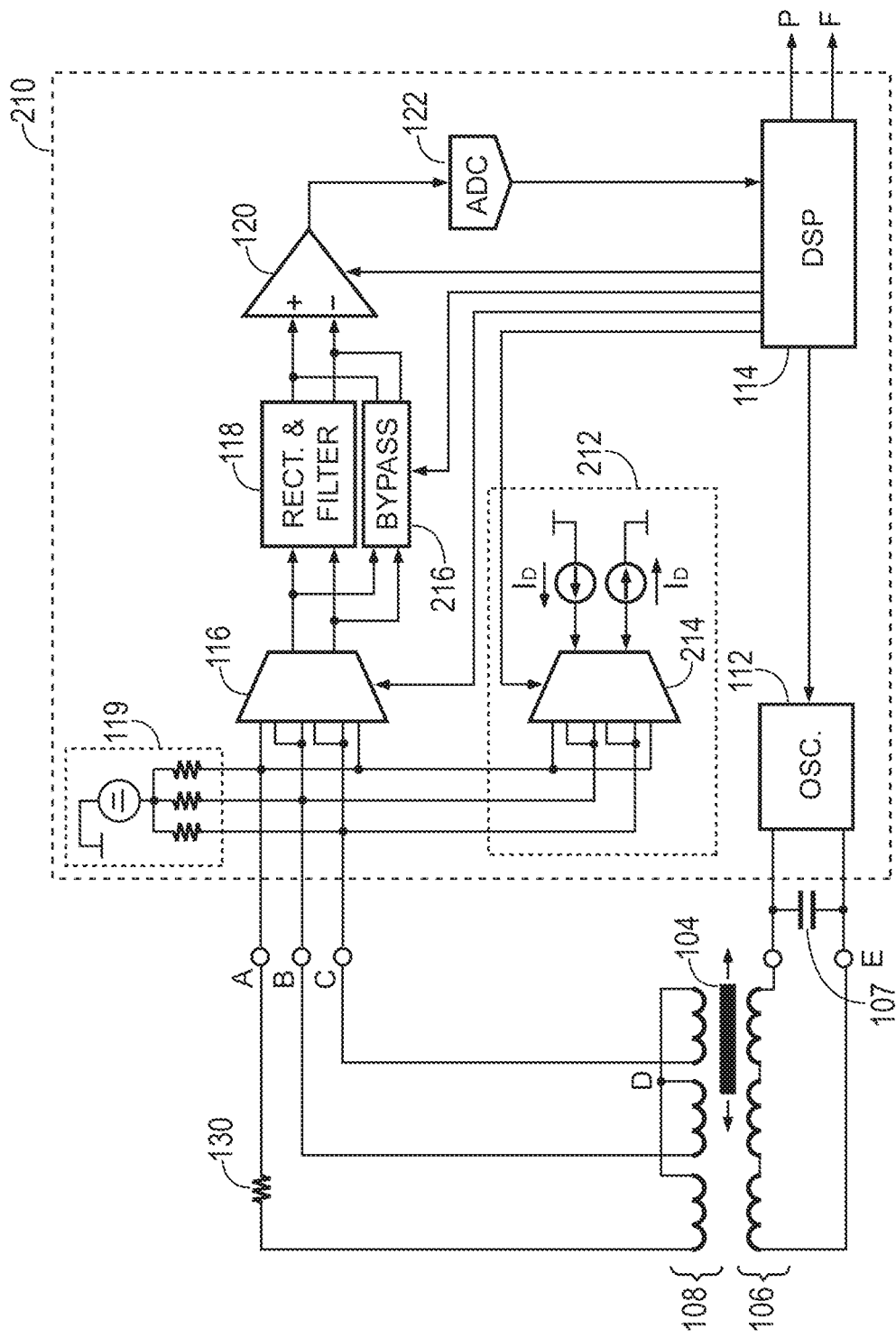
FIG. 2 is a schematic diagram of an illustrative angular position sensor with integrated fault detection.

The term 'pin' is herein used to refer to a terminal of an integrated circuit. Such terminal may be embodied as a lead of a lead frame, as a contact pad (such as in case of a QFN or BGA package), or even as a mechanical pin. The use of the terms "approximately" or "substantially" mean that a value of an element has a parameter that is expected to be close to a stated value. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "first", "second", "next", "last", "before", "after", and other similar terms are used for description and ease of reference purposes only and are not intended to be limiting to any configuration of elements or sequences of operations for the various embodiments of the present disclosure. Further, the terms "coupled", "connected" or otherwise are not intended to limit such interactions and communication of signals between two or more devices, systems, components or otherwise to direct interactions—indirect couplings and connections may also occur. Further, the terms "and" and "or" are not intended to be used in a limiting fashion, but rather to cover any possible range of combinations of elements and operations of an embodiment of the present disclosure.

DETAILED DESCRIPTION

FIG. 1A shows an illustrative set of coils for sensing an angular position of a rotor 102. The illustrative set includes an excitation coil surrounding three sensing coils. Each sensing coil coupled between an external terminal A, B, or C, and a shared node D that serves as the "star point" of the coil configuration. The sensing coils each have an approximate "figure-eight" configuration so that, in the absence of rotor 102, they have no net response to a signal applied to terminals E. The rotor 102 includes an area 104 of different permittivity or conductivity that modifies the coupling between the excitation coil and the sensing coils as the rotor turns, producing coil signals indicative of the angular position of the rotor. Area 104 may be implemented as a conductive patch, a coil, a reduced or increased substrate thickness, a different material, or even as a hole or cut-out.

FIG. 1B shows an equivalent circuit for the coil-rotor arrangement. As area 104 moves, it modifies the coupling between the excitation coil 106 and the various sensing coils 108. An illustrative sensor controller 110 includes an oscillator 112 that supplies an excitation signal to terminals E of the excitation coil. A parallel capacitance 107 may be provided internally or externally to set a resonant frequency at which the coil can be driven for increased efficiency. In some contemplated implementations, the excitation signal has a frequency between about 3 MHz and about 4 MHz.

The illustrative controller includes an integrated microcontroller 114 which may be a programmable digital signal processor or application specific integrated circuit such as a finite state machine (FSM)-based microcontroller. The microcontroller 114 detects the responsive sensing coil signals via terminals A, B, and C. The illustrative controller 110 includes a multiplexer 116 that selects sensing coil signals in pairs from terminals A and B, B and C, or C and A. Each of the selected signals is optionally filtered, with or without rectification, before being supplied to the inputs of a differential amplifier 120.

Where rectification is used (e.g., where the excitation signal frequency is higher than the sampling frequency of ADC 122), the controller 110 includes a common mode bias circuit 119 to guarantee that the sensing coil signals are unipolar (i.e., always positive, or alternatively, always negative). Though a single voltage source is shown, the bias circuit 119 may employ a plurality of voltage sources. Bias circuit 119 includes resistors to avoid suppressing the sensing coil signals. These resistors may for instance have a resistance value in the range of 10-30 kΩ, and may be the same or different.

The filtering may be provided by analog circuit blocks configured to exclude noise and electromagnetic interference outside a narrow range around the carrier frequency of the excitation signal, and of course the rectified signal may be filtered to reduce signal ripple and to limit the signal bandwidth to the Nyquist frequency for the ADC.

The differential amplifier 120 amplifies the difference between the selected signals, and an analog to digital converter (ADC) 122 digitizes the amplified difference. Amplifier 120 is preferably provided with gain and input offset compensation so that the microcontroller 114 can provide automated gain and offset control. The microcontroller 114 derives the angular position of the rotor 102 and stores the position information P in an internal register where it is available for the system controller to access and monitor. The microcontroller 114 may also combine the position information with past measurements and other parameters to determine other measurements such as angular velocity, angular acceleration, and related spatial values (linear displacement, velocity, acceleration). Statistical measurements, such as minimum values, maximal values, mean values, may also be determined and stored in associated internal registers. The sensor controller 110 may regularly, or upon request, transmit measured parameter values via a bus, for instance a PWM bus, or a SENT bus, or an analog bus, to the host system controller.

FIG. 1C shows a graph of illustrative signal differences as a function of rotor orientation. The amplitude of the signal differences has been normalized, and the rotor orientation is shown in degrees. The microcontroller 114 can unambiguously determine the rotor orientation from the three signal difference values. Though the illustrative inductive position sensor is a rotational positional sensor, it can also be implemented as a linear position sensor using the same principles. Though only three windings are shown in the illustrative sensor, some contemplated implementations include more than three windings to provide redundancy, increased position measurement accuracy, and/or (in a linear position sensor) increased measurement range. Each of the additional windings would be similarly connected between a terminal and a star point.

Automobiles can employ such inductive position sensors in many ways, e.g., to sense vehicle level, variable nozzle turbine geometry, accelerator pedal position, throttle position, exhaust gas recirculation valve position, steering angle, steering torque, gearbox position. As with many automobile sensors, the consequences of sensor failure can be disastrous particularly if the sensor still appears to the rest of the system to be working normally. The International Organization for Standardization (ISO) has established various standards including ISO 26262 "Road vehicles—Functional Safety", which provides four classes of Automotive Safety Integrity Level (ASIL), setting limits on undetected failure probabilities. Sensors serving critical roles should be designed to the most stringent risk class, ASIL D, which may require detection of failures that lead to unacceptable errors of the sensor signal, such as a position signal. The unacceptable error is for instance more than 3%, preferably more than 2% and more preferably more than 1%.

One way in which electronic sensors can silently fail (i.e., fail while appearing to operate normally) involves loosening of a solder connection due, e.g., to vibration or mechanical/thermal stress. Integrated circuits are formed on semiconductor substrates, which may be electrically connected to package pins via solder connections and bonding wires. Those package pins may in turn be solder-connected to PCBs. Such connections can fail gradually, as stress or fatigue induces cracking, delamination, or other separation which alone or in combination with corrosion or other exposure effects increases resistivity of the connection. The increased resistivity 130 (FIG. 1B) attenuates the sensor signals, and though the sensor may automatically compensate for such effects, the consequent increase in signal to noise ratio (SNR) causes growth in the size and/or rate of sensor errors. To guard against such failure modes, it is desirable for the sensor to monitor the sensing coils to detect any increase in connection resistance 130 of the sensing coils.

FIG. 2 shows an illustrative angular position sensor with a controller 210 having integrated fault detection. Sensor controller 210 includes the elements of sensor controller 110 (FIG. 1B), but further includes a detection current injector 212 having a demultiplexer 214 or switch arrangement that couples whichever pair of terminals A, B, C, is currently selected by multiplexer 116 to a matched current source and current sink. The current is preferably derived from a trimmed and therefor temperature-stable current reference. An illustrative magnitude would be in the range of 10-20 μA, for instance 13-16 μA, causing a connection resistance over about 500 ohms to sustain a voltage drop in excess of 5 mV, but other magnitudes would also be suitable.

If terminals A and B are selected, the current source injects a detection current $I_D$ to terminal A and the current sink draws an equal detection current $I_D$ from terminal B. The current source and current sink are also connectable to terminals B and C, and to terminals C and A. In at least some contemplated implementations, the detection current applied to each selected terminal pair is a direct current (DC) pulse.

While the detection current injector 212 is active, the microcontroller 114 actuates bypass switches 216 to couple the selected terminal voltages directly to differential amplifier 120, i.e., without being rectified and/or filtered. Differential amplifier 120 amplifies the difference between the selected terminal voltages, and ADC 122 digitizes the amplified difference. The microcontroller 114 stores the voltage difference measurement for later use, or alternatively derives a winding impedance measurement between the selected terminals and stores that for later use.

The microcontroller 114 obtains a voltage difference and/or impedance measurement for each pair of terminals, comparing them to each other and/or to a predetermined value to detect any discrepancies such as an increased connection resistance 130 that may be indicative of connection weakening and potential failure in the near future. The microcontroller 114 may further compare the voltage difference and/or impedance measurements to historical values and/or predetermined limits to enable detection of actual failures such as shorted windings, disconnected assembly connections or other forms of open circuit. Upon detecting a mismatch greater than a preset threshold or an out-of-range value, the microcontroller 114 signals detection of a fault F. In some implementations, the microcontroller 114 sets a bit or stores a value in an internal register to indicate detection of a discrepancy, which the host controller periodically polls to verify continued sensor operability. Upon detecting the fault signal, the host controller may illuminate a warning lamp and/or sound a warning tone to alert the user to the presence of a fault and the need for repair.

The weakness detection is not merely relevant so as to enable replacement of the sensor system prior to complete failure, but also in order to minimize errors in the detected parameter, such as an error in the detected position. It has turned out that a significant position error may occur due to a weakened connection as part of an input loop. Such significant error may be more than 5%, or more than 2% or even more than 1%, as a consequence of the weakened connection having an additional resistance of at least 10 kΩ. There may also be an effect if the weakened connection has an additional resistance of merely 5 kΩ, or even lower such as 3 kΩ, 2 kΩ or 1 kΩ. The detection approach described with reference to FIG. 2 enables detection of impedance variations, and hence increases of the resistance, of as little as 500Ω.

Having detected a variation in the coil impedances, the microcontroller 114 can compensate for associated signal attenuation and/or employ redundant sensing coil signals in place of signals from coils having weakened connections. For instance, if one line between an input and a sensing coil would be weakened, leading to an increased error in the calculated position, the microcontroller 114 may use a different algorithm. For instance sense signals associated with the weakened terminal connection may be averaged over time, or may not be used in the evaluation.

This detection method is based on an integrated circuit specifically configured for the testing of the sensing coils. The integrated circuit is moreover configured such that a test may be performed in the course of the lifetime of the sensor system, either incidentally or regularly. The frequency of the test performance may be determined by a host system controller that transmits instructions to the sensor controller 210. As will be understood by the skilled person, it is also feasible that the sensor controller IC has been programmed to perform a test in accordance with a program stored in an embedded memory of the integrated circuit. Such a program may include frequency of the test, any repetition of the test based upon results of a test run, and/or corrections to be applied based on environmental or other conditions such as temperature, age, etc. While the detection method and the integrated circuit have been optimized in one embodiment for the detection of resistances of as little as 500Ω, the same principles could also be used for the detection of larger variations or increases of the resistance.

The detection current injector 212 forces the current to flow in a loop through two of the sensing coils. FIGS. 3A & 3B show a simplified sensor schematic in which the demultiplexer 214 and multiplexer 116 are shown as pairs of three-way switches SW1, SW2 and SW3, SW4. In the illustrated embodiment, at least one switch SW1 is present between the current source 50 and the terminals A-C. Furthermore, at least one switch SW2 is present between the terminals A-C and the current sink 51. The switch SW1 enables selection of the specific terminal A-C that gets connected to the current source 50. The switch SW2 enables selection of the specific terminal A-C that gets connected to the current sink 51.

The provision of the detection current from the current source 50 through the current loop generates a differential voltage between the terminals connected to the current source 50 and the current sink 51. The option of selecting the terminals A-C enables the differential voltages between the terminals to be measured sequentially. Furthermore, measurements can be carried out bi-directionally, increasing the number of detection signals and potentially increasing measurement precision. The generated differential voltages are the detection signals that are thereafter processed and evaluated.

According to a first implementation, which is illustrated in FIG. 2, the sensing circuitry (multiplexer 116, differential amplifier 120, and ADC 122, collectively referenced in other figures as module 40) is configured not only for acquiring position measurements, but also for measuring the detection signals. As the detection signals may well be different from the sense signals (i.e. have a different voltage level), the amplifier 120 may need to be reconfigured so as to amplify the detection signal to an appropriate magnitude. Such reconfiguration will be performed under control of the microcontroller 114. Furthermore, any rectifiers in the sensing circuitry 40 are suitably bypassed or switched off, as they might disturb processing of the detection signals. Such would again occur under control of the microcontroller 114.

In the embodiment illustrated in FIG. 2, the microcontroller 114 performs the detection signal evaluation. It is observed that the detection signal evaluation may alternatively be arranged as a separate module from the microcontroller 114. The detection signal evaluation determines on the basis of the amplified and digitized detection signals whether there is a disconnection in an input loop (such as represented by connection resistance 130), whether a connection or coil is weakened and/or close-to-failure, or whether the test confirms that the input loop is functional. The detection signal evaluation may make use of reference values stored in a memory, such as a programmable memory and/or a shift register. It will be understood that the detection signal evaluation may be implemented as a firmware module or hardware embodiment of the associated algorithms so as to verify correctness of the measured values by comparison between all detection signals and/or stored detection signals. Furthermore the detection signal evaluation module implementation may transmit signals to the microcontroller 114 to transmit control signals to the detection current injector 119, demultiplexer 214 (switches SW1, SW2), the multiplexer 116 (switches SW3, SW4), the amplifier 120, and to any other component so as to repeat generation of detection signals.

FIGS. 3A and 3B show schematic diagrams in which two phases of the fault detection method are represented. Only relevant portions of the sensor controller 210 have been shown for sake of clarity. The figure furthermore shows the presence of Resistors R0, R1 and R2 in series with the sensing coils 90-92 respectively to represent parasitic resistances or discrete resistors that may be added as a design option. It is expected that resistors R0, R1, R2 are at least approximately equal.

In the fault detection phase of FIG. 3A, the current source 50 is connected via the first switch SW1 to the first terminal A, leading to the first sensing coil 90, and then via the star point back through the second sensing coil 91 and the second terminal B. However, due to imminent failure, an additional connection resistance 130 ("RC") is present in the current loop. As a consequence, the total resistance in the input loop will be R0+RC+R1, and the detection voltage is thus $V_{R0}+V_{RC}+V_{R1}$. This detection voltage is coupled to the differential amplifier 120 by appropriate switching of the multiplexer switches SW3, SW4.

In the fault detection phase of FIG. 3B, all switches are set in a different position, leading to a connection of the current source 50 to the second terminal B, and the return via the third terminal C. The voltage due to the detection current is now $V_{R1}+V_{R2}$. A similar situation can be understood for the third fault detection phase, leading to a voltage of $V_{R0}+V_{RC}+V_{R2}$. After amplification and digitization, the three fault detection signals are evaluated by the microcontroller 114, which may detect weakness or failure if any two of the three detection signal voltages differs by more than a predefined threshold.

In comparison to a variant approach in which the detection current is sourced to or sunk from the sensing coils without matched current sinking or sourcing, the disclosed approach has the advantage that for a fully operational sensor the common mode voltage of the sensing coils (i.e., the star point voltage) is kept constant. In the absence of a connection weakness or failure, the common mode voltage is not influenced by the detection currents unless there is a failure in the form of RC 130. There is no need of charging and discharging any capacitance connected to the star point D, which would cause radiated emissions through the sensing coils. Moreover, the resulting voltages are 50% higher, increasing the detection sensitivity. Additionally, the disclosed approach provides current flow through each sensing coil in both directions. Such bidirectional current flow improves detectability of a short in the sensing coils.

Figure 4A:
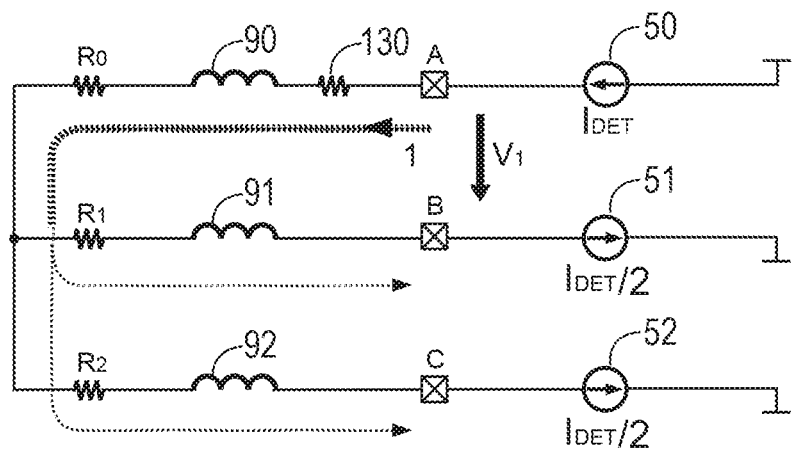
FIGS. 4A through 4C show alternative current loops in the sensing coils.
Figure 4B:
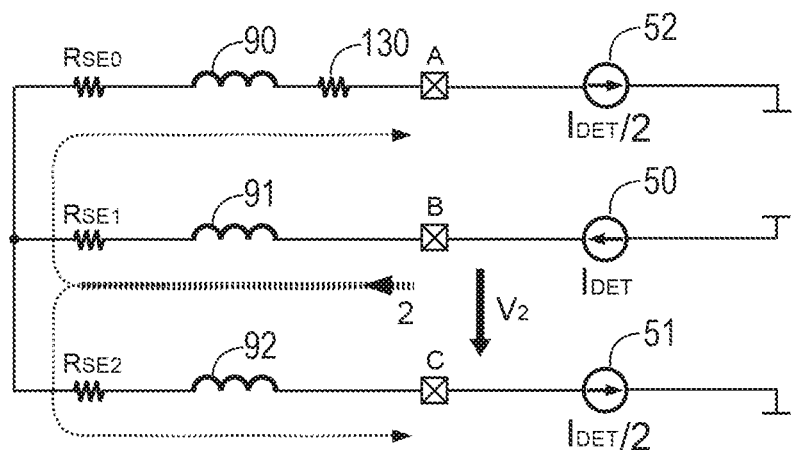
Figure 4C:
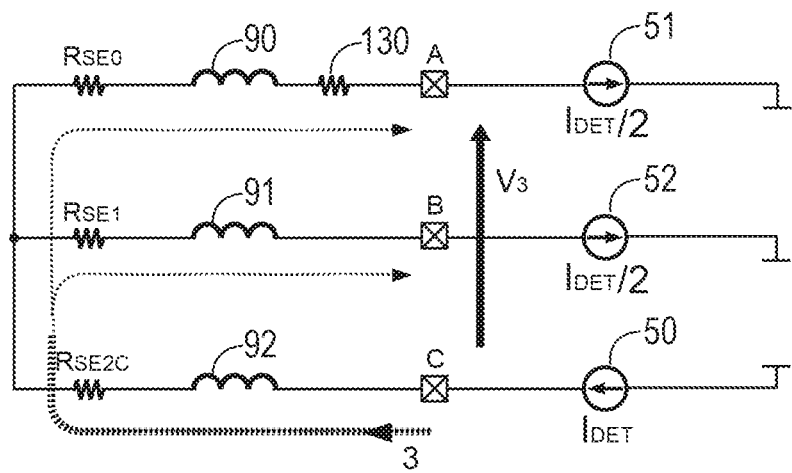

Though the detection current injector has been shown as providing equal currents from the current source to the current sink, this is not a requirement. The total current provided by the detection current injector should sum to zero (treating sources as positive and sinks as negative), additional current sources and/or sinks may be employed and the currents may be distributed unevenly among them. FIGS. 4A-4C schematically show test phases of one such implementation. For sake of understanding, the depiction of the system has been simplified to the sensing coils, the terminals A-C, and the current sources and sinks 50-52. In the present example, the current source 50 provides a full detection current $I_D$, current sink 51 draws a half detection current $I_D/2$, and the second current sink 52 draws a half detection current $I_D/2$. Each of the current sources/sinks 50-52 is connected to one of the terminals A-C. The selection of terminals is rotated to provide a measurement for each pair of sensing coils.

The selection of the sensing coil for current source 50 may occur with the switch SW1 as indicated in FIGS. 2 and 3A-3B. The resulting differential voltages $V_1$, $V_2$, $V_3$, between the selected pair of terminals are amplified and converted to digital values for processing by the microcontroller 114. FIG. 4A shows current source 50 coupled to terminal A, while current sinks 51 and 52 are coupled to terminals B, C. FIG. 4B shows current source 50 coupled to terminal B while current sinks 51, 52 are coupled to terminals C, A. FIG. 4C shows current source 50 coupled to terminal C while current sinks 51, 52 are coupled to terminals A, B.

Thus, in summary, the present application relates to a method of detection of operation effectiveness of connections, particularly those connected to an integrated circuit as defined on a semiconductor substrate, and preferably outside of the package for the integrated circuit. It is however not excluded that the method is used to verify operation effectiveness of the package. With operation effectiveness, reference is made to the fact whether the said connections are adequate or less than adequate, in which case they will have an increased impedance. The detection method is envisaged to be applied in the course of the lifetime of a product, but can also be used as part of a test prior to sales of a product.

The operation effectiveness is detected on the basis of a measurement of impedances, and more particularly resistances. A current source is coupled, optionally via a switch, to a pin (or bond pad). A current sink is coupled to a second pin (or bond pad) to create a current loop between external to the integrated circuit which connects the first and the second pin. As a consequence thereof, a differential voltage is present between the first and the second pin (or bond pad) which can be processed and evaluated in an evaluation module.

The present application also relates to an integrated circuit having an evaluation module and the said current source and sink, as well as a system comprising the integrated circuit, in which a first and a second pin are connected, external to the integrated circuit via a current loop.

Although various embodiments have been described above with a certain degree of particularity, or with reference to one or more individual embodiments, those skilled in the art could make numerous alterations to the disclosed embodiments without departing from the spirit or scope of the claims. Other embodiments are therefore contemplated. It is intended that all matter contained in the above description and shown in the accompanying drawings shall be interpreted as illustrative only of embodiments and not limiting.

What is claimed is:

1. A sensor system comprising a plurality of sensing coils arranged in a star configuration on a first side of each sensing coil, each of the sensing coils having a second side coupled to terminals of an integrated circuit, such that a first and a second terminal are connected external to the integrated circuit via a loop including a first and a second sensing coil in the plurality of sensing coils, the integrated circuit including:
   sensing circuitry for evaluation of sense signals received from the sensing coils via said terminals;
   a current source and a current sink coupled to respectively a first and a second of said terminals, such that upon supply of current from the current source a current is established through the loop external to the integrated circuit and a detection signal is generated;
   an evaluator for evaluating one or more detection signals to detect failure and/or weakness within said loop.

2. The sensor system as claimed in claim 1, wherein the current source and the current sink are each coupled to said first and second terminal respectively.

3. The sensor system as claimed in claim 1, wherein the sensing circuitry comprises an amplifier, an analog-to-digital converter, and a microcontroller that implements the evaluator as an application specific finite state machine.

4. The sensor system as claimed in claim 3, wherein the sensing circuitry further comprises a rectifier upstream of the analog-to-digital converter, wherein the sensing circuitry is configured for disabling and/or bypassing said rectifier during receipt of a detection signal.

5. The sensor system as claimed in claim 1, wherein the evaluator is coupled to the terminals via a test path comprising a multiplexer, an amplifier, and an analog-to-digital converter, said test path being arranged in parallel to the sensing circuitry.

6. The sensor system as claimed in claim 1, wherein each of said terminals is connected to a bias circuit.

7. The sensor system as claimed in claim 1, further comprising an excitation coil, and wherein the sensing coils are shifted relative to each other by a predefined angle, wherein a movable inductive coupling element is arranged so as to define a magnitude of inductance between the excitation coil and the sensing coils on the basis of the movable inductive coupling element's position relative to the sensing coils.

8. The sensor system as claimed in claim 7, wherein the excitation coil is driven by a driving signal originating from an oscillator within the integrated circuit.

9. The sensor system as claimed in claim 1, wherein the evaluator is configured for detecting an open connection in the loop and a weakened connection in the input loop relative to a proper connection in the loop.

10. The sensor system as claimed in claim 1, wherein a digital signal processor that is part of the sensing circuitry is configured for the provision of a control signal to enable the current source and optionally to set any switches between the current source and a selected terminal.

11. An integrated circuit for use in a sensor system having a plurality of sensing coils arranged in a star configuration on a first side of each sensing coil, each of the sensing coils having a second side coupled to terminals of an integrated circuit, such that a first and a second terminal are connected external to the integrated circuit via a loop including a first and a second sensing coil in the plurality of sensing coils, the integrated circuit comprising:
   sensing circuitry for evaluation of sense signals received from the sensing coils via said terminals;
   a current source and a current sink coupled to respectively a first and a second of said terminals, such that upon supply of current from the current source a current is established through the loop external to the integrated circuit and a detection signal is generated;
   an evaluator for evaluating one or more detection signals to detect failure and/or weakness within said loop.

12. The integrated circuit as claimed in claim 11, wherein the current source and the current sink are coupled to said first and second terminal respectively.

13. The integrated circuit as claimed in claim 11, wherein the sensing circuitry comprises an amplifier, an analog-to-digital converter, and a microcontroller that implements the evaluator as an application specific finite state machine.

14. The integrated circuit as claimed in claim 13, wherein the sensing circuitry further comprises a rectifier upstream of the analog-to-digital converter, wherein the sensing circuitry is configured for disabling and/or bypassing said rectifier during receipt of a detection signal.

15. The integrated circuit as claimed in claim 11, wherein the evaluator is coupled to the terminals via a test path comprising a multiplexer, an amplifier, and an analog-to-digital converter, said test path being arranged in parallel to the sensing circuitry.

16. The integrated circuit as claimed in claim 11, wherein each of said terminals is connected to a bias circuit.

17. A method for detection of an open or weakened connection in an inductive sensor system having a plurality of sensing coils arranged in a star configuration on a first side of each sensing coil, each of the sensing coils having a second side coupled to terminals of an integrated circuit, such that a first and a second terminal are connected external to the integrated circuit via a first loop including a first and a second sensing coil, the second terminal is connected to a third terminal via a second loop including the second sensing coil and a third sensing coil, and the third terminal is connected to the first terminal via a third loop including the first and third sensing coils, the method comprising:
   applying a current through said first, second, and third loops to obtain first, second, and third detection signals;
   verifying that the first, second, and third detection signals match each other or a predetermined value to evaluate a status of connections in said plurality of sensing coils.

18. The method of claim 17, wherein said applying includes coupling each possible pair of the first, second, and third terminals to a matched current source and current sink.

19. The method as claimed in claim 17, wherein the one or more detection signals are amplified and converted from analog to digital prior to their evaluation.

20. The method as claimed in claim 17, further comprising:
  driving an excitation coil of the inductive sensor system;
  receiving sense signals resulting from excitation of said excitation coil via one or more of the sensing coils; and
  processing said sense signals to evaluate a position of the inductive sensor system or one or more parts thereof.

\* \* \* \* \*